United States Patent
Bejerano et al.

(10) Patent No.: US 8,717,875 B2
(45) Date of Patent: May 6, 2014

(54) CONDENSED CORE-ENERGY-EFFICIENT ARCHITECTURE FOR WAN IP BACKBONES

(75) Inventors: Yigel Bejerano, Springfield, NJ (US); Andrea Francini, Mooresville, NC (US)

(73) Assignee: Alcatel Lucent, Paris (FR)

(*) Notice: Subject to any disclaimer, the term of this patent is extended or adjusted under 35 U.S.C. 154(b) by 168 days.

(21) Appl. No.: 13/088,142

(22) Filed: Apr. 15, 2011

(65) Prior Publication Data

US 2012/0263185 A1  Oct. 18, 2012

(51) Int. Cl.
- H04L 12/26 (2006.01)
- H04L 12/28 (2006.01)
- H04L 12/66 (2006.01)
- G06F 15/173 (2006.01)
- G06F 15/16 (2006.01)

(52) U.S. Cl.
USPC ........... 370/218; 370/235; 370/254; 370/401; 370/406; 709/223; 709/239; 709/249

(58) Field of Classification Search
USPC ................. 370/254, 400, 218, 235, 401, 406; 709/223, 239, 249
See application file for complete search history.

(56) References Cited

U.S. PATENT DOCUMENTS

| | | | |
|---|---|---|---|
| 8,126,009 B2* | 2/2012 | Chung et al. | 370/466 |
| 8,340,101 B2* | 12/2012 | Fourcand | 370/395.42 |
| 2006/0023681 A1* | 2/2006 | A'Rafat | 370/338 |
| 2006/0239188 A1 | 10/2006 | Weiss et al. | |
| 2007/0076706 A1* | 4/2007 | Shirizly | 370/389 |
| 2007/0133433 A1* | 6/2007 | Nam et al. | 370/254 |
| 2007/0192406 A1* | 8/2007 | Frietsch et al. | 709/203 |
| 2008/0279196 A1* | 11/2008 | Friskney et al. | 370/395.53 |
| 2010/0054240 A1 | 3/2010 | Beshai | |
| 2010/0246410 A1* | 9/2010 | Tallet | 370/244 |

OTHER PUBLICATIONS

The International Search Report and the Written Opinion of the International Searching Authority, or the Declaration, in PCT/US2012/032999, mailed Jul. 4, 2012, Alcatel-Lucent USA Inc., Applicant, 12 pages.

* cited by examiner

*Primary Examiner* — Alpus H Hsu
*Assistant Examiner* — Anthony Luo
(74) *Attorney, Agent, or Firm* — Wall & Tong, LLP (57) ABSTRACT

An energy-efficient architecture for wide area network (WAN) Internet Protocol (IP) backbones in which a condensed core apparatus routes packets between access routers of different points of presence (PoPs), where the PoPs do not need to include core routers.

25 Claims, 10 Drawing Sheets

CONDENSED CORE-ENERGY-EFFICIENT ARCHITECTURE FOR WAN IP BACKBONES

FIELD OF THE INVENTION

The invention relates generally to communication networks and, more specifically but not exclusively, to improved architectures for routing packets.

BACKGROUND

In commonly deployed wide area network (WAN) Internet Protocol (IP) backbone architectures, the network comprises multiple geographically distributed points-of-presence (PoPs) placed in close proximity to respective regional networks. Each PoP provides communication services to client regional networks (e.g., metropolitan area networks or enterprise networks) and connects these regional networks to other PoPs. The backbone network that interconnects the PoPs typically consists of a partially connected mesh of long-haul optical links. Each PoP is itself a mesh network composed of core and access routers. PoP access routers provide connectivity to the clients, while the core routers provide connectivity between the access routers and core/access routers of other PoPs.

Figure 1:
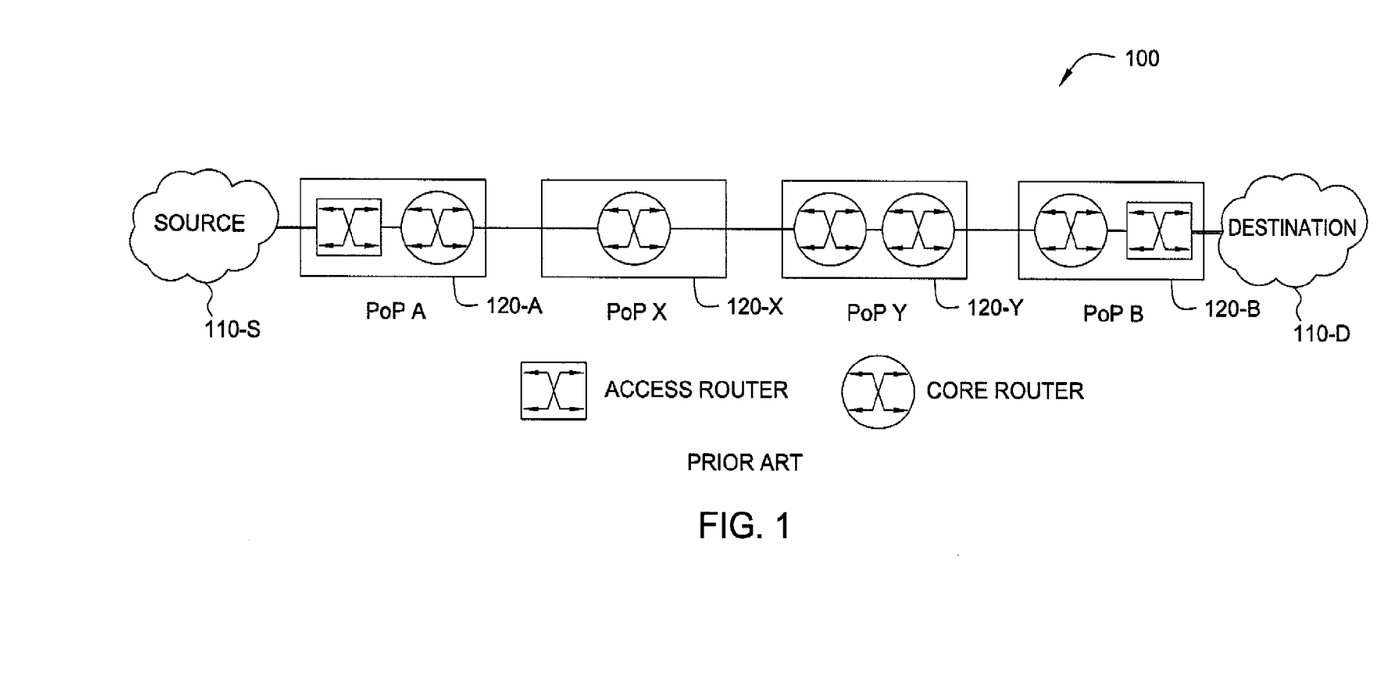
FIG. 1 depicts a high-level block diagram of a communications path routed through a prior art core routing system.

As a consequence of the partial connectivity of the optical mesh that forms the WAN backbone network, the network path between a source-destination pair may span multiple PoPs and pass through multiple core routers. For example, FIG. 1 shows the internal structure of a PoP 120-A and the PoP connectivity with its attached regional networks 110-S as well as with other PoPs 120. In this conventional setting, a data packet that travels from a regional network served by a first PoP 120-A to a remote regional network served by a second PoP 120-B traverses multiple core routers: at least one core router in each of PoP 120-A and in Pop 120-B, and then the core routers in the several intermediate PoPs, with possibly more than one core router per intermediate PoP.

BRIEF SUMMARY

Various deficiencies of the prior art are addressed by the present invention of an energy-efficient architecture for wide area network (WAN) Internet Protocol (IP) backbones in which a condensed core apparatus routes packets between access routers of different points of presence (PoPs), where the PoPs do not need to include core routers.

In one embodiment, a condensed core apparatus for routing packets between access routers of different points of presence (PoPs) comprises a plurality of ingress routers, each ingress router configured to receive packets from one or more access routers, determine a destination address associated with each received packet, and map each packet to one or more of a plurality of paths terminating at an access router associated with said destination address; a plurality of core transport switches, each core transport switch supporting a plurality of paths; and a plurality of egress switches, each egress switch configured to convey toward one or more access routers packets received at the egress switch via paths supported by the egress switch and one or more core transport switches.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The invention will be primarily described within the context of a condensed core (CC) apparatus adapted for use in conveying core traffic between PoPs, however, those skilled in the art and informed by the teachings herein will realize that the invention is also applicable to traffic routing topology, network, methodology and the like benefiting from a reduced dependence upon conventional routing structures, a reduced energy expenditure, a deterministic number of hops per pass and other features as described herein.

Part of the invention lies in the realization by the inventors that the IP router is an energy-inefficient building block of packet networks. Major sources of energy consumption in IP routers include (a) the data-path hardware devices that perform packet processing, (b) the off-chip memories needed for storage of the routing tables, (c) the off-chip memories needed for buffering data packets, and (d) the interconnection lines between those memories and the packet processing devices.

Figure 2:
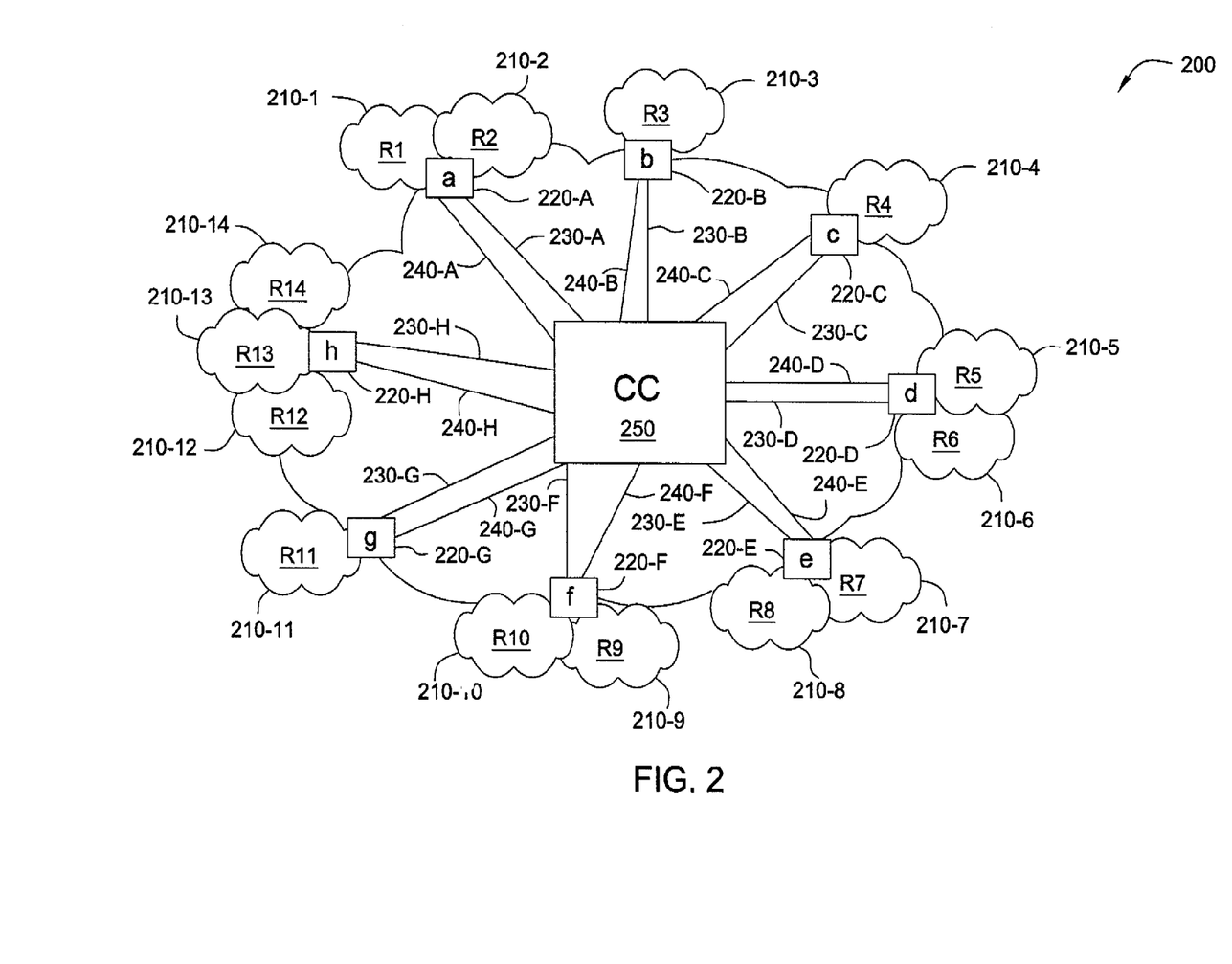
FIG. 2 depicts a high-level block diagram of a core routing system configured according to one embodiment.

FIG. 2 depicts a high-level block diagram of a core routing system configured according to one embodiment. The core routing system of FIG. 2 provides, illustratively, a fault-resilient, energy-efficient architecture for WAN IP backbones. The architecture may be used in various embodiments to replace the partially connected mesh of PoPs that are typical of current deployments with a geographically condensed packet switching core. That is, rather than a core implemented using core routers deployed at each of a plurality of points of presence, a centralized "condensed core" (CC) is implemented.

Specifically, FIG. 2 depicts a plurality of regions 210 denoted as regions R1 through R14 (i.e., 210-1 through 210-14), where each region is supported by a point of presence (PoP) 220. Specifically, each of a plurality of PoPs 220 denoted as PoPs A through H (i.e., 221-A through 220-H) is associated with or otherwise supports one or more of the regions 210. Each PoP 220 is used to support traffic flows between network elements within the one or more respective supported regions 210 and network elements in other regions (i.e., network elements in regions supported by other PoPs). Each of the PoPs 220 is connected to a condensed core (CC) 250 via at least two node-disjoint long range or long-haul transmission paths 230 and 240.

It is noted that the PoPs 220 of the core routing system 200 depicted in FIG. 2 include only access routers and do not include IP core routers. In this manner, every end-to-end network path within the core routing system 200 is supported by a determinable number of IP routing elements. For example, in one embodiment three IP routing elements are used to support any end to end network path within the core routing system 200; namely, an IP routing element (access router) at a source PoP, an IP routing element (access router) at a destination PoP, and an IP routing element (condensed core ingress router) at the edge of the condensed core 250.

The condensed core (CC) 250 provides a fault-resilient, energy-efficient WAN backbone architecture for connecting the various PoPs 220. The CC 250 advantageously enables the PoPs 220 to avoid using IP core routers by replacing the typical full or partial optical PoP interconnection mesh with a single virtual IP core router connected directly to the access routers at each POP, as illustrated in FIGS. 3 and 4.

Figure 3:
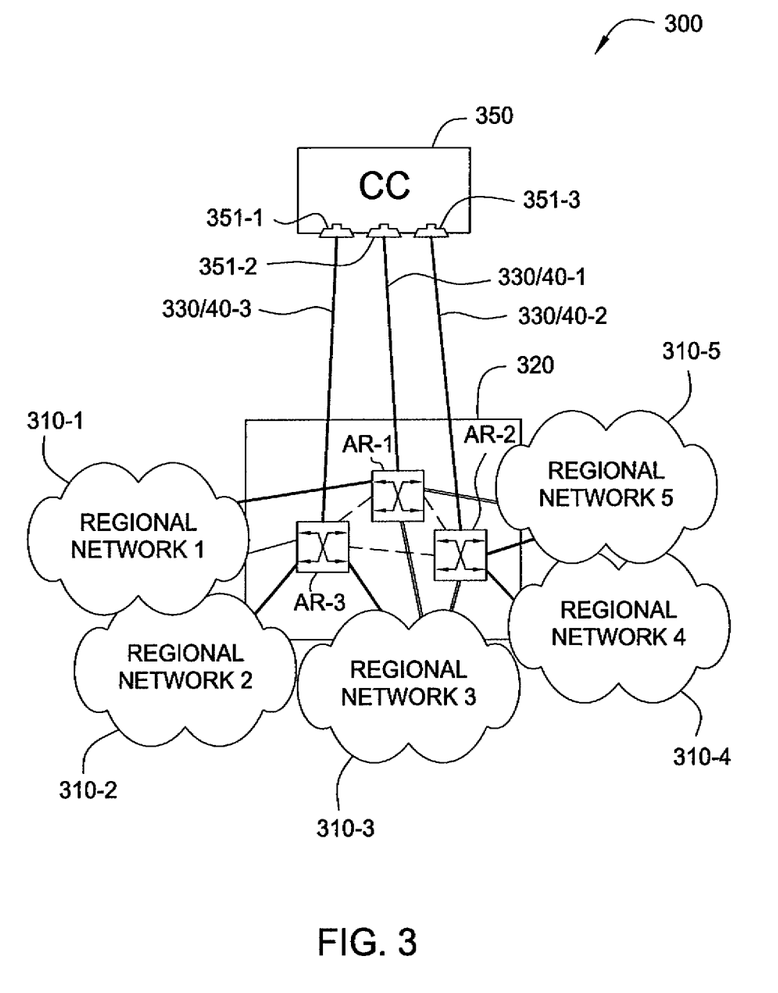
FIG. 3 depicts a high-level block diagram of a PoP supporting communication between multiple regional networks and a condensed core according to one embodiment.

FIG. 3 depicts a high-level block diagram of a PoP supporting communication between multiple regional networks and a condensed core according to one embodiment, such as described above with respect to FIG. 2. Specifically, a PoP 320 comprises, illustratively, three access routers AR denoted as AR-1, AR-2 and AR-3. Each of the access routers AR communicates with one or more regional networks 310 via respective short-range or short-haul communications links. The access routers AR also communicate with each other via short-haul communications links. Each of the access routers AR-1 through AR-3 communicates with a respective port 351 of a condensed core (CC) 350 via respective upstream and downstream long-haul communications links 330/340.

In various embodiments, the condensed core is geographically proximate and/or integrated with one of the PoPs.

Figure 4:
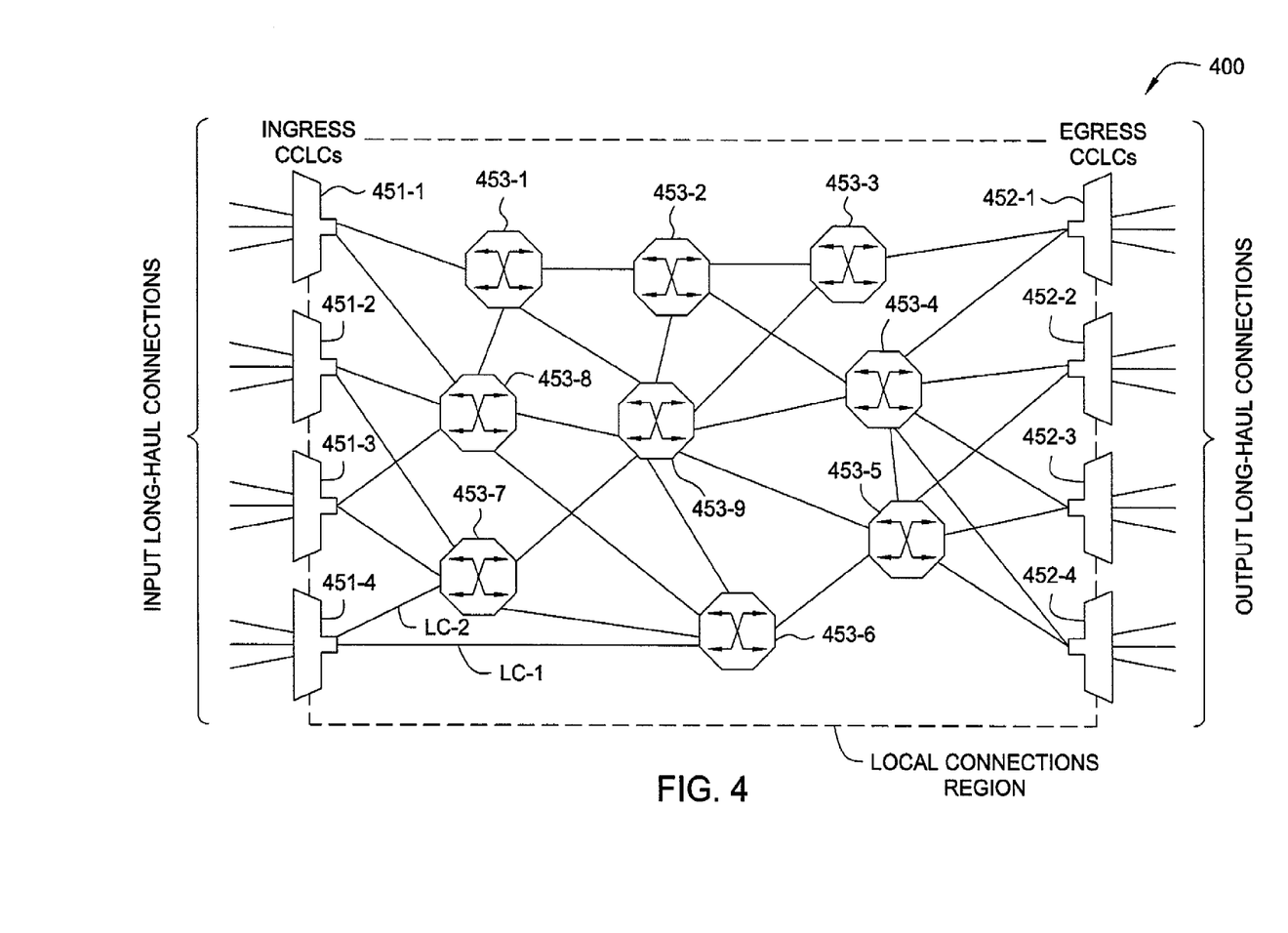
FIG. 4 depicts a high-level block diagram of a condensed core according to one embodiment.

FIG. 4 depicts a high-level block diagram of a condensed core according to one embodiment, such as described above with respect to FIGS. 2-3. Specifically, a condensed core 400 comprises a plurality of ingress devices 451 for receiving data from input long-haul connections, a plurality of egress devices 452 for transmitting data to output long-haul connections, and a plurality of switching devices 453 for selectively switching data between the ingress devices 451 and egress devices 452. In various embodiments the ingress devices 451, egress devices 452 and switching devices 453 are all located proximate to each other to form a local connections region such that interconnection paths between the devices are supported by short-haul communications links.

In one embodiment the condensed core comprises a perimeter of condensed core line cards (CCLCs), interconnected by a network of switching devices denoted as core transport switches (CTSs). The CCLCs may be implemented in a manner functionally similar to router line cards in that each CCLC contains packet processors, traffic managers with packet buffers and so on.

Every packet that an ingress device 451 such as a CCLC receives from a PoP is classified and associated with the label of a tunnel to form a data unit called a condensed-core frame. The tunnel specifies the frame path through the condensed core, from an input port of the ingress device or CCLC to an output port of an egress device or CCLC. The egress device or CCLC strips the frame of its label and forwards the resulting packet to its destination access router. At the ingress device or CCLC, the packet may be examined and the identity of the destination access router of the packet may be used to contribute to the selection of the assigned tunnel label. The packet destination address may constitute the sole criterion for selecting an assigned tunnel or one of a plurality of criteria for selecting an assigned tunnel.

Each ingress/egress device or CCLC is connected to at least one CTS; various embodiments use multiple CTSs such as for redundancy purposes. The CTSs form a mesh network that interconnects all the ingress/egress devices or CCLCs.

In one embodiment, each CCLC serves as both an ingress CCLC with IP routing capabilities for origination of the condensed core tunnels, and as an egress CCLC without IP routing capabilities for termination of the condensed core tunnels.

In one embodiment, each CTS comprises a high-capacity single-chip switch that forwards data frames based on tunneling labels included in the data frame headers. In this embodiment, known tunneling technologies such as Multi-Protocol Label Switching (MPLS) may be used. Optionally, proprietary schemes may also be used for defining the label format and the signaling mechanisms for label assignment and distribution. The frame format may either require all frames to have equal size or may allow different sizes, depending upon the embodiment.

In various embodiments, the condensed core is adapted to be defined and managed as a distributed router by a network management system.

Figure 5:
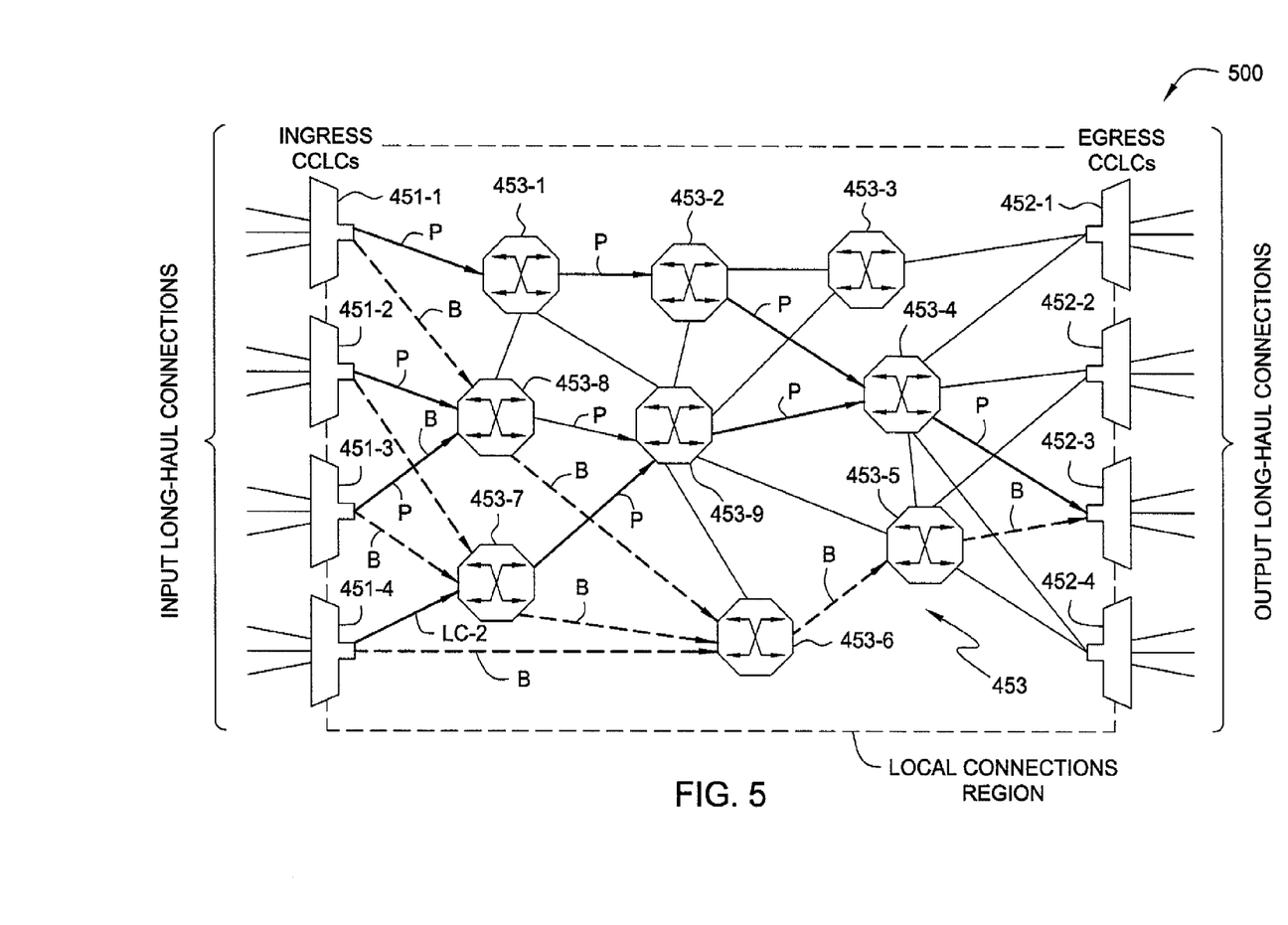
FIG. 5 depicts a high-level block diagram of a condensed core providing fault resiliency according to one embodiment.

FIG. 5 depicts a high-level block diagram of a condensed core providing fault resiliency according to one embodiment, such as described above with respect to FIGS. 2-4. Specifically, the condensed core 500 is similar to the condensed core 400 described above with respect to FIG. 4, except that the condensed core 500 provides fault resiliency by utilizing at least two node-disjoint paths between every pair of ingress and egress devices or CCLCs.

Specifically, referring to FIG. 5, it is assumed for purposes of this discussion that data received at any of a plurality of ingress devices 451 is destined for transmission via a particular egress device; namely egress device 452-3. It can be seen that traffic received by any ingress device 451 is routed to egress device 452-3 via one or both of a respective primary path P or respective backup path B through the various core transport switches 453 forming the condensed core 500.

Referring to FIG. 5, the primary paths P are shown as solid lined arrows while the backup paths B are shown as dash lined arrows. In particular, the primary path associated with ingress device 451-1 includes CTSs 453-1, -2 and -4, while the backup path includes CTSs 453-8, -9 and -4; the primary path associated with ingress device 451-2 includes CTSs 453-8, -9 and -4, while the backup path includes CTSs 453-7, -6 and -5; the primary path associated with ingress device 451-3 includes CTSs 453-8, -9 and -4, while the backup path includes CTSs 453-7, -6 and -5; and the primary path associated with ingress device 451-4 includes CTSs 453-7, -9 and -4, while the backup path includes CTSs 453-6 and -5 (i.e., a two-hop backup path).

Within the context of the above-described embodiments, each PoP is implemented using only access routers, while the CC is implemented as a perimeter of ingress routers interconnected by a mesh of CTSs. Thus, all PoPs are interconnected via one ingress router and a mesh of core transport switches within the CC, which are themselves interconnected using short-haul communications links.

Generally speaking, within the condensed core, a CTS switches each frame based on its tunnel label. Every tunnel originates at the core-facing interface of an ingress CCLC, where the frames are delineated and encapsulated according to the format adopted by the condensed core, and terminates at the PoP-facing interface of an egress CCLC, where the frame encapsulation is stripped and the original IP packets are restored. Since every tunnel ends at a network interface that directly faces a PoP access router, the egress CCLC does not perform any IP function (i.e., does not need to examine or inspect the IP header of individual IP packets), and for this reason is logically referred to as an egress switch. Consequently, with a WAN backbone configured according to the various embodiments, an inter-PoP data packet traverses no more than three IP routers (network nodes where packets are processed and routed based on the contents of their IP header); namely the access router in the source PoP, the ingress CCLC at the edge of the condensed core, and the access router in the destination PoP. This condition guarantees minimization of the IP forwarding capacity needed to sustain the overall load of inter-PoP traffic, thereby reducing substantially the energy needed to operate the WAN backbone.

In various embodiments, at least some of the tunnels terminate at destination PoP access routers rather than at a PoP-facing interface of an egress CCLC. In these embodiments, the CTS supporting the tunnel may be coupled to the destination PoP via a long-haul link or a short-haul link as appropriate.

Tunneling and Data Format in the Condensed Core

In various embodiments, IP routing functions are not performed by the CTSs within the CC; rather, each CTS forwards every data frame based on a tunnel label carried in the frame header. At a given CTS, every different label identifies a distinct tunnel, which ultimately maps onto a destination access router at one of the PoPs that are interconnected by the WAN backbone. The destination access router that maps the label is directly connected, through an optical path, to an output interface of an egress condensed core line card (CCLC). An access router that is not directly connected to a CCLC does not have a corresponding label in the condensed core.

Figure 6:
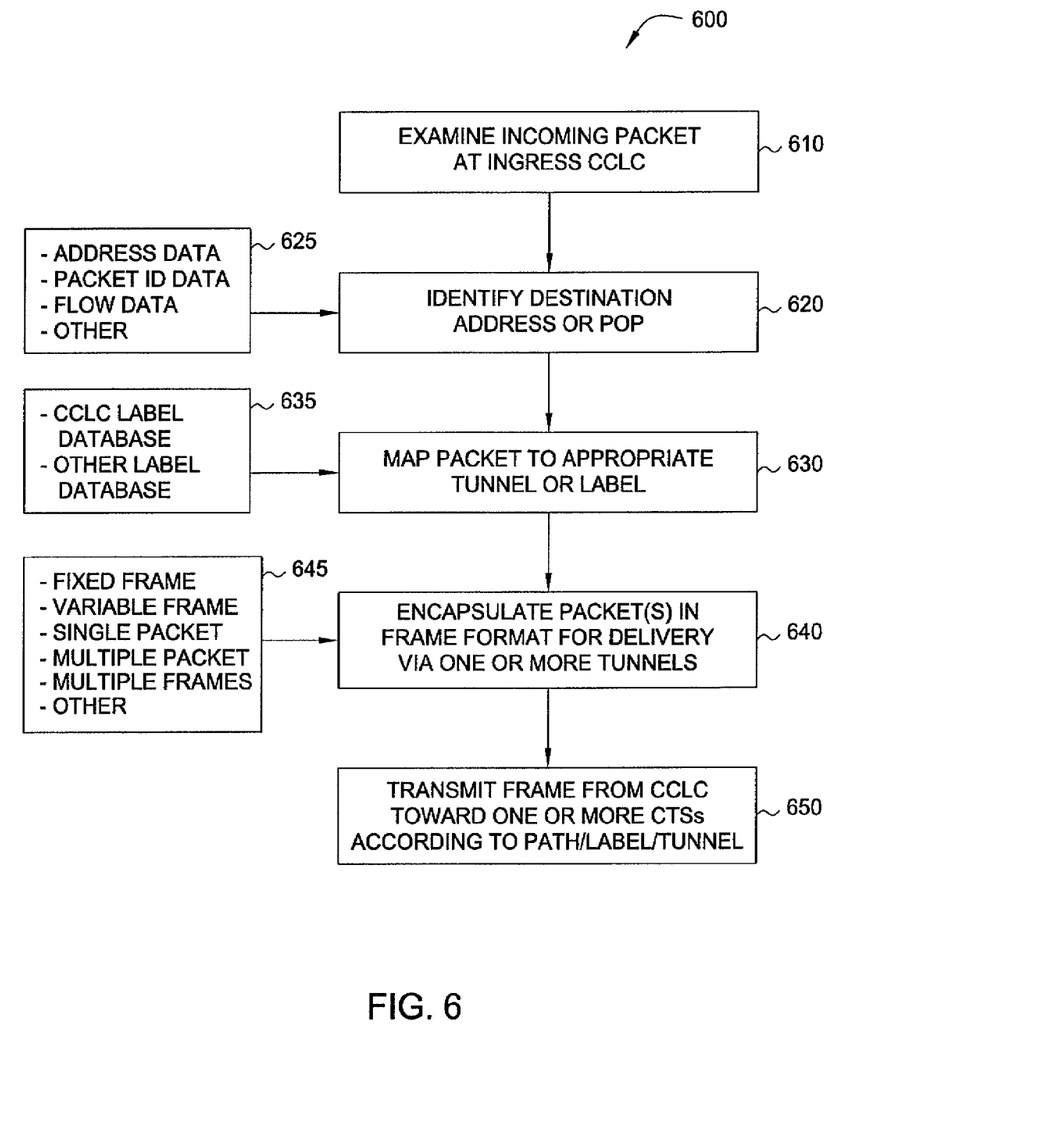
FIG. 6 depicts a flow diagram of a method according to one embodiment.

FIG. 6 depicts a flow diagram of a method according to one embodiment. Specifically, the method 600 of FIG. 6 is directed to a packet processing at an ingress routing device or CCLC according to one embodiment.

At step 610, a newly received packet is examined by an ingress routing device or CCLC, and at step 620 the destination address or destination PoP of the packet is identified. That is, referring to box 625, header information or payload information within or associated with the newly received packet may be examined to identify at-risk data, packet identification data, traffic flow data and/or other data.

At step 630, the packet is mapped to an appropriate tunnel label in response to the identified destination address or PoP. That is, referring to box 635, information stored at a local CCLC label database or other label database is retrieved to identify the appropriate tunnel and or label associated with the destination address or PoP.

At step 640, the packet is encapsulated individually or with other packets in a frame format for delivery via one or more tunnels to the destination address or PoP. Referring to box 645, the frame format may comprise any of a fixed frame size format, a variable frame size format, a frame including a single packet, a frame including multiple packets, multiple frames including portions of the packets and/or any other frame format suitable for traversing the condensed core CTS network.

At step 650, the CCLC transmits one or more frames toward one or more CTSs within the condensed core according to the appropriate path, label and/or tunnel information.

Generally speaking, the ingress routing device or CCLC uses its IP routing capabilities to identify the destination access router of every incoming packet, and accordingly maps each packet onto an appropriate tunnel label. The ingress routing device or CCLC includes the packet queuing and processing facilities needed for encapsulation of the incoming packets into the reference frame format.

The frame format adopted for the condensed core defines whether frames may be composed of a single packet or include multiple packets, such as up to a fixed or maximum frame size. There are benefits and drawbacks of aggregating multiple packets into larger frames. The main tradeoff is between energy savings, obtained by reduction of the frequency at which frame handling operations have to be performed, and network performance in terms of delay and throughput (individual packets may experience extensions of their queuing delays due to the need to wait for more packets before a full frame is formed and ready for transmission out of the ingress CCLC).

The egress device or CCLC maps every incoming frame onto one of its output ports, based upon, illustratively, the tunnel label in the frame header. After identifying the output port, the egress CCLC strips the frame header and, in the case of a multi-packet frame, separately queues the original IP packets in front of the output port.

The CTS is the single building block of the interconnection network between the ingress and egress CCLCs. To forward packets from the ingress devices or CCLCs to the egress devices or CCLCs, the CTS uses a small table to map tunnel labels onto output interfaces. The number of tunnel labels handled by the CTS, which is also the number of tunnels that traverses a single CTS, does not typically need to exceed the number N of access routers that are directly connected to the condensed core.

Reduced Memory Embodiments

In various embodiments, to maximize the energy efficiency of the CTS, off-chip packet buffer memories are completely removed from the CTS. To help enable the removal of buffer memories without unduly compromising the traffic throughput across the condensed core, the CTS exchanges backpressure signals with its contiguous CTS and CCLC instances. The propagation delay of the backpressure signals between contiguous nodes defines the amount of buffering that the CTS must provide to avoid packet losses. Conversely, the maximum size of the buffer memory that can be implemented on-chip in the CTS and the aggregate forwarding capacity of the CTS define the maximum accepted distance between a CTS and its contiguous CTS and CCLC instances.

For illustrative purposes, assume that an on-chip buffer memory size is selected as $B_{Max}=32$ MB, that half of the buffer space is allocated for mitigation of the effects of the backpressure propagation latency ($\Delta B_{Max}=16$ MB), that the aggregate forwarding capacity is $C=1$ Tbps, and that the speed of propagation of data signals in the interconnection links is $v=2\cdot 10^8$ m/s, then the maximum length of the CTS input links that is compatible with the latency of backpressure propagation is given by the following equation:

$$L_{Max} = v \cdot \frac{\Delta B_{max}}{C} = 2\cdot 10^8 \cdot \frac{128\cdot 10^6}{10^{12}} = 25.6 \text{ km}. \quad \text{(eq. 1)}$$

Because of the small value of $L_{Max}$ (small with respect to the geographical coverage of typical WAN backbones), the core of the WAN backbone must be condensed within a concentrated geographical area (the actual extent of the covered area scales linearly with the size of the on-chip buffer memory and with the inverse of the aggregate forwarding capacity of the CTS).

The perimeter of the condensed core may also be constrained in size, causing aggregation of the CCLCs in clusters that can be spaced apart, but within distances that are compatible with the CTS forwarding capacity and buffer size. In one embodiment, this clustering approach is adapted for use in placing the CTS elements. Specifically, the subdivision of the CCLC and CTS populations into clusters that are spaced apart is adapted to provide fault resiliency within the condensed core in case of occurrence of most types of catastrophic events and equipment faults.

Queuing and Traffic Management in the CTS

The CTS removes the need for off-chip buffer memories by adoption of a flow-control mechanism (backpressure) that limits the rate of arrival of data frames received from the CTS and ingress CCLC instances immediately upstream. In one embodiment, a link-based backpressure mechanism is used to guarantee that every frame entering the CTS interconnection network is never dropped on its way to the destination access router. In other embodiments, more sophisticated flow control frameworks are used to provide finer granularity in the identification of the backpressure targets so that stricter Quality-of-Service (QoS) guarantees may be enforced.

Figure 7:
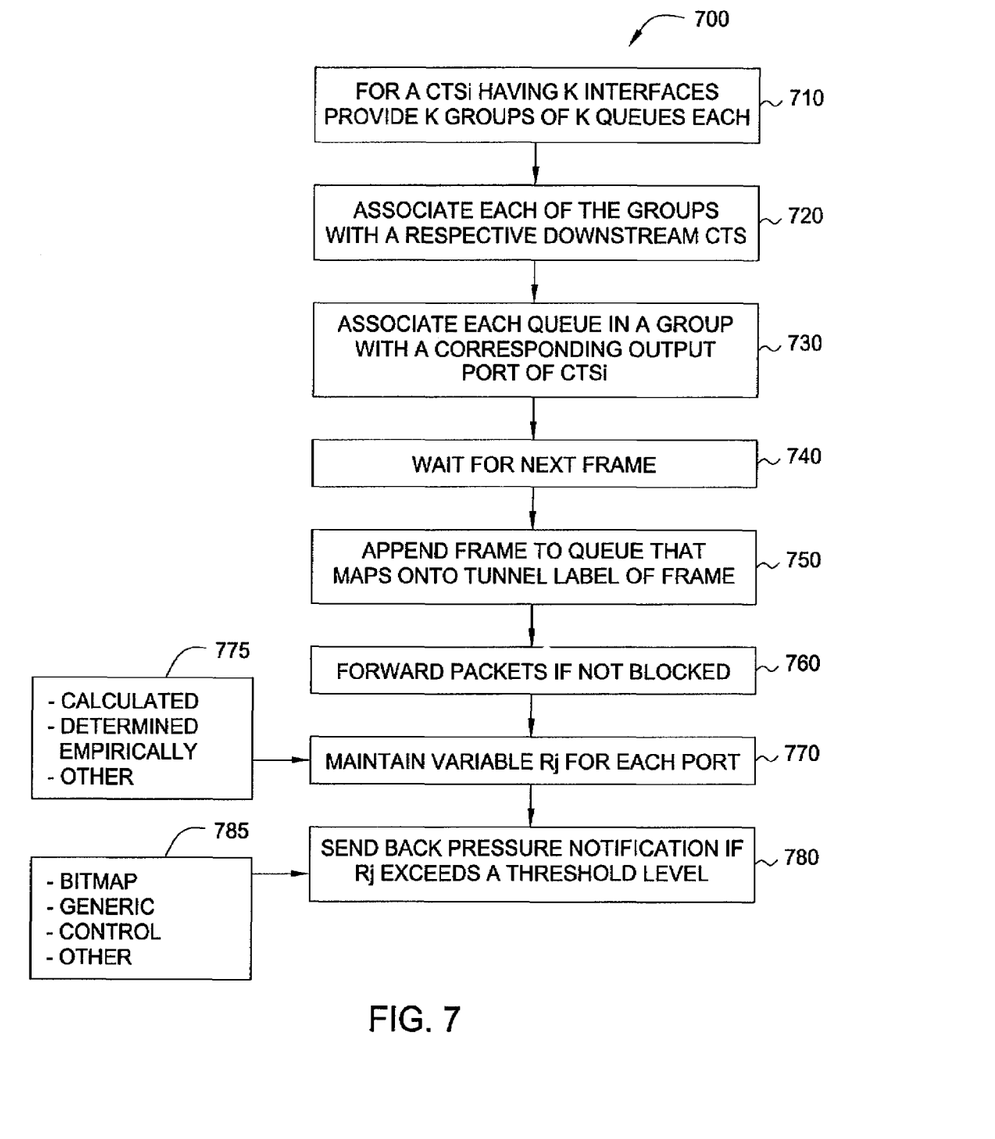
FIG. 7 depicts a flow diagram of a queuing structure and link-based backpressure mechanism according to one embodiment.

FIG. 7 depicts a flow diagram of a queuing structure and link-based backpressure mechanism according to one embodiment.

Referring to step 710, a CTS denoted as CTSi and having K interfaces maintains K groups of K queues each.

At step 720, each of the groups is associated with an output port of CTSi, and therefore with a respective downstream CTS. For example, a queue group j of CTSi is associated with an output port j and the corresponding downstream CTS called CTSj.

At step 730, each queue in each group is associated with a corresponding output port of the CTS immediately downstream. For example, each queue Qjp in queue group j of CTS i is associated with an output port p of CTSj.

At step 740, the method waits for a next frame to be received by the CTS.

At step 750, when a next frame is received by the CTS, that frame is appended to a queue that maps onto a tunnel label associated with the frame. For example, when CTSi receives a frame it appends it to the queue that maps onto the tunnel label of the frame (the mapping takes into account the output port in CTSj that is traversed by the tunnel).

At step 760, frames can be forwarded from a queue to its corresponding output port if the queue is not blocked. For example, at any given time, the state of a queue Qjp may be either blocked or active, depending on the value of the respective backpressure bit in the latest notification received from CTSj. When blocked, queue Qjp is not allowed to forward packets to CTSj until it becomes active again by clearing of the backpressure bit in a subsequent notification from CTSj.

At step 770, a variable Rj is maintained for each output port in CTSi. Referring to box 775, the variable Rj may be calculated, empirically determined, or defined using some other mechanism. For example, for every output port/CTSi CTSi maintains a variable Rj that represents the total length of all the queues of queue group j and runs a scheduler that extracts frames from the heads of the active queues according to a scheduling policy of choice, for example an instance of the weighted-round-robin (WRR) scheduling algorithm. While the scheduler of output port j can drain the queues of group j at a rate within the capacity of the port, the same queues can be filled at a much higher rate because they can receive frames from up to K input ports.

At step 780, a backpressure notification message is sent upstream in response to the variable Rj exceeding a threshold level. Referring to box 785, the backpressure notification may comprise any of a bitmap indicative of one or more blocked-state queues, a generic message indicating a particular blocked-state queue, a control message or some other type of message or signal indicative of one or more blocked-state queues. For example, to avoid congestion and frame overflow events, CTSi monitors the variable Rj for every output port j. When Rj exceeds a certain threshold (calculated below) CTSi sends backpressure notification messages to all of its upstream neighbors, to stop the transmission of frames destined for port j. The backpressure notification sent to an upstream CTS or CCLC may consist of a bitmap with K bits, where each bit represents a distinct output port of CTSi. When a bit of the bitmap is set, the corresponding queue in the upstream CTS or CCLC enters the blocked state.

Backpressure Thresholds and Geographical Coverage

The sizing of the backpressure thresholds may be driven by a goal of avoiding buffer overflow conditions and frame losses after assertion of backpressure to the upstream CTS or CCLC instances. For example, assuming that CTSi asserts backpressure for a queue group j when the group total length, denoted by Rj, exceeds a threshold T, we can expect a maximum of $b_{Max} = c \cdot L_{Max}/v$ more bits to arrive to the CTS before the backpressure indication takes effect at the upstream CTS or CCLC, where c is the capacity of the input link (e.g., c=100 Gbps) and v is the signal propagation speed along the input link (approximately, $v = 2 \cdot 10^8$ m/s). In a worst case, up to K bursts of frames destined for group j may arrive from all the K ingress ports before the upstream nodes respond to the backpressure assertion by stopping the transmission of frames. The maximum amount of bits that CTSi may receive for group j before backpressure becomes effective at all upstream nodes is $\Delta B_{Max} = C \cdot L_{Max}/v$, where $C = K \cdot c$ is the aggregate forwarding capacity of the CTS. Given the total buffer size $B_{Max}$ and the maximum distance $L_{Max}$ between the CTS and any of its upstream nodes, the backpressure threshold T can be computed as follows:

$$T = \frac{B_{Max} - \Delta B_{Max}}{K} = \frac{B_{Max} - C \cdot L_{Max}/v}{K}. \quad \text{(eq. 2)}$$

As an example, with C=1 Tbps, $B_{Max}$=32 MB, $L_{Max}$=10 km and K=10, the backpressure threshold is T=2.6 MB.

The formula that defines the per-queue-group backpressure threshold can be reversed to define the maximum physical distance allowed between contiguous nodes after the values of all other parameters (including the backpressure threshold, which is arbitrary) are known:

$$L_{Max} = v \cdot \frac{\Delta B_{Max}}{C} = v \cdot \frac{B_{Max} - K \cdot T}{C}. \quad \text{(eq. 3)}$$

For instance, with $\Delta B_{max} = B_{Max}/2$ the maximum distance between two CTSs (and between a CTS and a CCLC) is $L_{Max}$=25.6 km. In selecting the value of the backpressure threshold T, the tradeoff is between high throughput per queue (higher T value) and low queuing delay (lower T value).

The values assigned to the parameters in the numerical example above reflect memory sizes and speeds that are attainable with a memory technology of the particular size. In this embodiment, the CTS elements can avoid packet losses entirely within the condensed core if the maximum distance between contiguous nodes does not exceed a few kilometers. As a consequence, the CTS elements and the CCLCs in various embodiments are concentrated in a geographical area that is generally much smaller than that covered by the entire WAN backbone. However, in various other embodiments using improved memory technologies having greater size and or speed, the geographical span of the condensed core is expanded.

Various embodiments contemplate the use of an egress switch that is used for frame decapsulation and does not need to respond to backpressure from a next element in a path. That is, the egress switch is the point where backpressure stops being used and where frame decapsulation takes place. By aggregating these two notions within a functionality defined as an egress switch, the egress switch may be implemented as a device of its own, a device co-located with a CTS, and/or a device co-located with a CCLC. Such modifications the condensed core are contemplated as being used individually or in combination in a condensed core arrangement.

As previously noted, an egress switch is not required to understand or respond to backpressure from the next node, which is typically the access router of a destination PoP. However, in some embodiments a long-haul link supporting communication between the egress switch and destination PoP may provide a backpressure indication for use by an egress switch.

Properties of the Condensed Core Interconnection Network

The topology of the interconnection network formed by the CTS elements can be adjusted to the evolution of the traffic demands between ingress and egress CCLCs. In general, the number of CTS elements needed increases with the uniformity of the traffic matrix. For fault-resiliency purposes, the aggregate switching capacity of the interconnection network can be augmented to accommodate redundant paths. One method for fault resiliency defines the degree of path redundancy that the network of CTS elements should offer.

Generally speaking, the queuing structure of the CTS does not depend on the number of tunnels that traverse it. This property eliminates any dependency between the scalability of the CTS and the size of the WAN backbone.

Long-Haul Segment

The concentration of the core of the WAN backbone in a relatively small geographical area (e.g., within a radius of few tens of kilometers) introduces a new segment in the overall architecture of the wide-area network (WAN). This portion of the network connects the PoPs to the condensed core and is denoted as the long-haul segment. In one embodiment, the long-haul segment of the WAN backbone is configured to avoid the use of IP routers. In various embodiments, the long-haul segment is implemented using a passive optical network.

In one embodiment, the long-haul segment comprises a sparsely connected mesh of optical paths where the degree of connectivity between the nodes is sufficient to define at least two node-disjoint paths between the condensed core and each PoP. In this manner, each PoP can rely on a primary optical path to the condensed core and a backup path for redundancy.

In one embodiment, for fault-resiliency purposes the paths that connect a PoP to the condensed core terminate at distinct CCLCs at the edge of the condensed core and at distinct access routers within the PoP.

Generally speaking, the condensed core network architecture described herein advantageously provides a deterministic number of routers that packets traveling between PoPs must traverse. In addition, the mesh of long-haul optical links that currently interconnects the edges of a WAN backbone is replaced by a modular interconnection network made of commoditized switching elements with minimal buffer space (the CTSs). Moreover, in various embodiments, the PoPs are connected to the condensed core by long-haul optical paths that are built entirely on optical components.

Since all inter-PoP traffic goes through the condensed core, the condensed core optimally aggregates all the traffic from/to each PoP and delivers it over the minimum number possible of optical (or Layer-2) connections. In addition, the dimensioning of the condensed core can be driven exclusively by consideration of the inter-PoP traffic demands and free of any constraints from the geographical placement of the PoPs. In distributed WAN backbone architectures, the placement of the PoPs plays a role in increasing the amount of deployed connectivity resources compared to the minimum required by the traffic demands. This property of the condensed core contributes to a leaner network with better energy efficiency.

Exemplary CCLC

Figure 8:
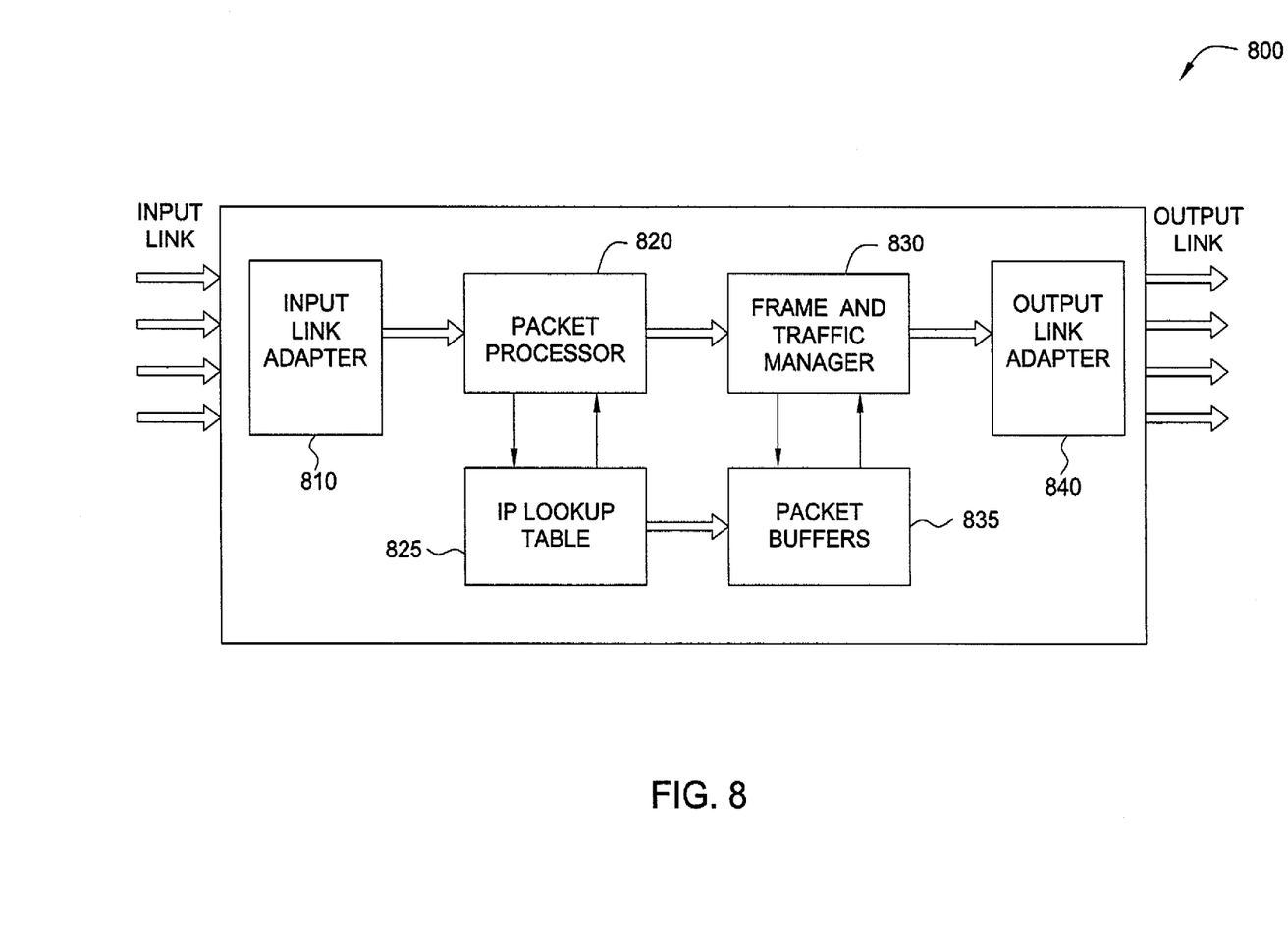
FIG. 8 depicts a high-level block diagram of a network comprising a plurality of Internet service providers (ISPs) according to one embodiment.

FIG. 8 depicts a high-level block diagram of a condensed core line card (CCLC) according to one embodiment. Specifically, FIG. 8 depicts a CCLC in which a plurality of input links are terminated at an input link adapter 810. The CCLC of FIG. 8 operates in substantially the same manner as described herein with respect to the various figures.

Packets conveyed to the input link adapter 810 are provided to a packet processor 820 which examines the packets to determine various source address, destination address and/or other parameters associated with the received packets. The packet processor 820 cooperates with an IP lookup table 825 which stores path related information associated with various IP addresses. For example, as discussed above with respect to FIGS. 1-7, the identified destination address or destination point of presence associated with an examined packet is used to map the packet to an appropriate tunnel label.

A framer and traffic manager 830 cooperates with packet buffers 835 to encapsulate one or more packets in a frame format for delivery to appropriate destination IP addresses or destination points of presence addresses. In various embodiments, the packet buffers 835 include various buffers associated with label defined path or tunnels, where packets are briefly buffered prior to encapsulation according to one frame format and transport via the appropriate label defined path or tunnel.

In various embodiments, a frame as specified by the selected frame format may include one or more consecutive packets that share the same destination access router. A frame may be delimited by a frame header field that includes the label of a path to the destination access router and by a frame trailer field that may contain information useful to preserve the integrity of the frame data contents. The payload field of a frame may have fixed size or be of variable size, and may include the initial or final segment of an incomplete packet. The framer may complete the construction of a frame when its payload is completely filled with packets, or when a predefined amount of time has elapsed after initiation of the frame construction.

An output link adapter 840 receives a frame including encapsulated packets and conveys or transmit the frames via one or more appropriate output links towards one or more respective next network elements supporting the appropriate label defined path or tunnel (e.g., one or more core transport switches within the condensed core).

Exemplary CTS

Figure 9:
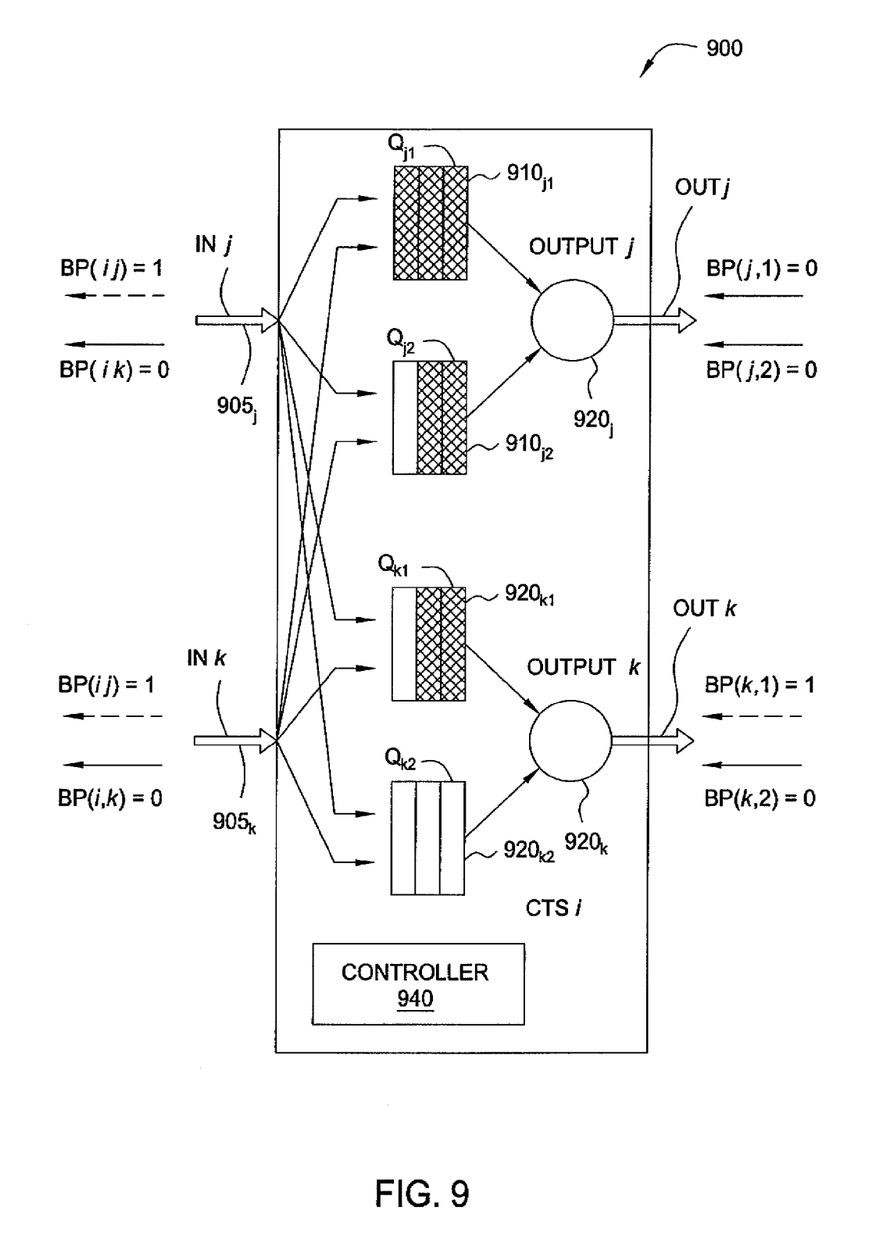
FIG. 9 depicts a high-level block diagram of a condensed core line card (CCLC) according to one embodiment.
Figure 10:
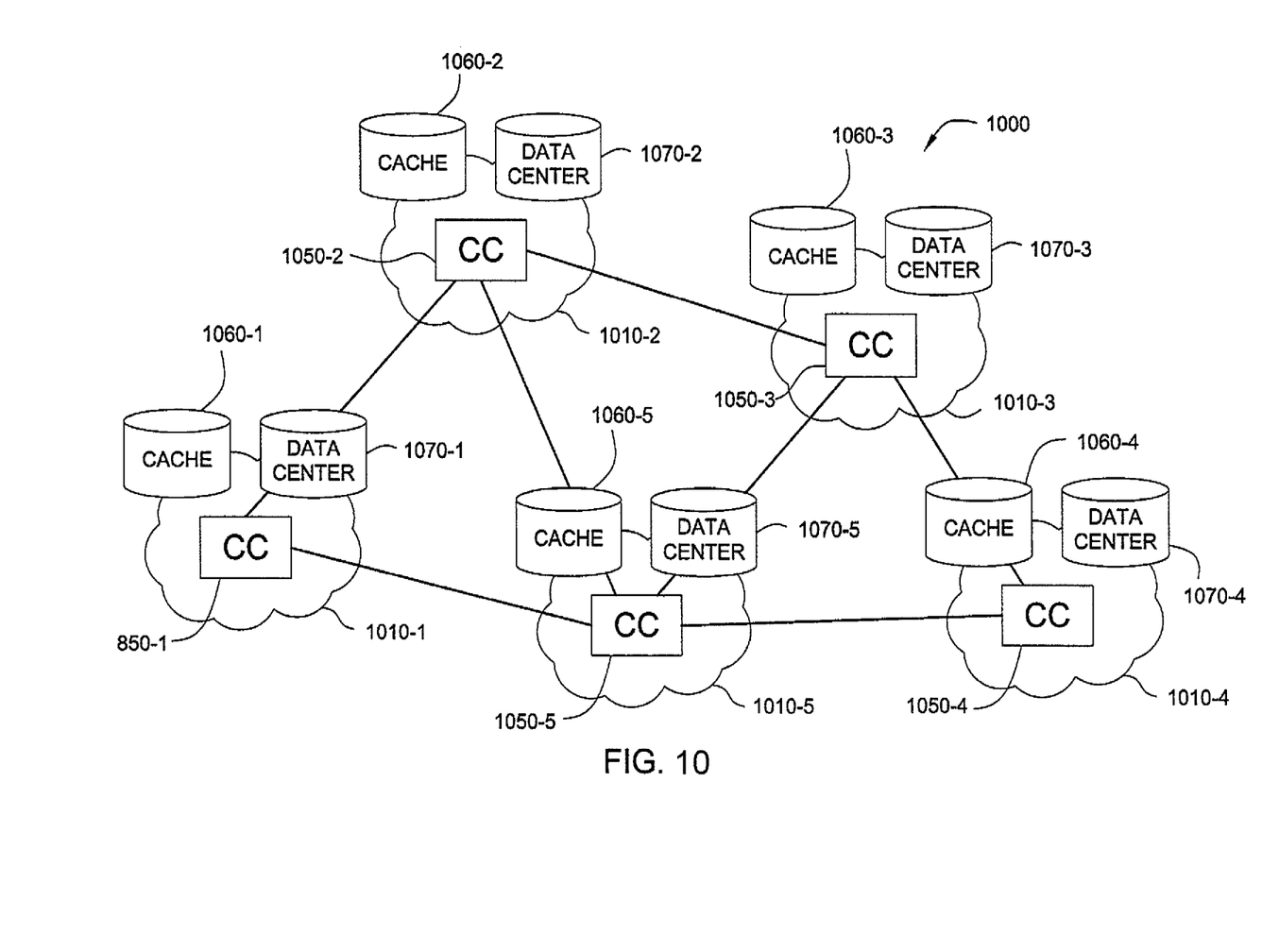
FIG. 10 depicts a high-level block diagram of a core transport switch (CTS) according to one embodiment.

FIG. 10 depicts a high-level block diagram of a core transport switch (CTS) according to one embodiment. Specifically, FIG. 9 depicts a simplified view of a CTS in which traffic received at each of a first input port $IN_j$ (905) and a second input port $IN_k$ ($905_k$) is routed to either or both of a first output port $OUT_j$ ($920_j$) and a second output port $OUT_k$ ($920_k$) via one or more of a plurality of queues $Q_{j1}$, $Q_{j2}$, $Q_{k1}$ and $Q_{k2}$ ($910_{j1}$, $910_{j2}$, $910_{k1}$ and $910_{k2}$). The CTS of FIG. 10 operates in substantially the same manner as discussed herein with respect to the various figures.

The utilization level of each of the plurality of queues $Q_{j1}$, $Q_{j2}$, $Q_{k1}$ and $Q_{k2}$ is monitored by control circuitry associated with the queues and/or a controller 940. As discussed above with respect to FIGS. 1-7, in response to queue utilization levels exceeding various threshold levels, the CTS 900 provides corresponding backpressure indicative signals via the input ports IN toward those network elements transmitting traffic to the CTS.

For example, referring to the various queues 910 depicted in FIG. 9, it can be seen that the first queue $910_{j1}$ is shown as fully shaded (indicative of full utilization), the second $910_{j2}$ and third $910_{k1}$ queues are shown as partially shaded (indicative of partial utilization), and the fourth queue $910_{k2}$ is shown as unshaded (indicative of low or no utilization). Since the first $910_{j1}$ and second $910_{j2}$ queues are associated with the first output port $OUT_j$ and their combined utilization level exceeds a corresponding threshold $R_j$, the backpressure signal associated with the first output port BP(i,j) is set to a logical "1" to indicate a congestion condition. It is noted that the backpressure signal associated with the first output port BP(i,j) is propagated from each of the input ports $905_j$ and $905_k$ toward network elements propagating traffic toward those input ports.

FIG. 10 depicts a high-level block diagram of a network comprising a plurality of Internet service providers (ISPs) according to one embodiment. Specifically, each of a plurality of, illustratively, five ISPs noted serves a respective community of users or subscribers within a respective region 1010. In effect, while each of the ISPs forms a distinct point of presence from a logical perspective, the sheer size or number of network elements associated with the ISP is such that from a physical perspective the condensed core topology discussed herein may be advantageously employed.

For each ISP, data traffic associated with the users or subscribers within a respective region 1010 of an ISP is transferred via one or more access routers (not shown) to a respective condensed core 1050. Additionally, each ISP is associated with a cache 1060 and a data center 1070. The cache 1060 may comprise a content cache or other cache suitable for use within the context of an ISP. The data center 1070 may comprise a network operations center (NOC) or other management systems suitable for use within the context of an ISP.

Each condensed core 1050 associated with a respective ISP communicates with at least one other condensed core 1050 associated with a neighboring ISP. Thus, in various embodiments, ISPs representing one or more points of presence are in communication with other ISPs representing one or more points of presence. In various other embodiments, the network topology associated with an ISP to use the condensed core topology discussed herein provides various management, energy, quality of service and other benefits to an individual ISP.

While the network of FIG. 10 is depicted as including five ISPs using a similar condensed core topology, it will be appreciated that not all of the ISPs need to use the condensed core topology. That is, in various embodiments the condensed core of an ISP may communicate with a condensed core of another ISP and/or a plurality of core routers associated with an ISP using a conventional topology.

In various embodiments, the format of data units transferred across the interconnection network of the condensed core is optimized to avoid requiring large queuing buffers within the various switching elements, thereby saving energy and preserving quality of service (QoS) levels.

In one embodiment, the condensed core is caused to adjust to time variations of the traffic demands per final destination such that an over allocation of bandwidth resources to any one destination is avoided. In this manner, the total amount of provisioned bandwidth needed to implement long-haul optical links feeding the condensed core is reduced.

In various embodiments, the condensed core topology enables a simplification of the control, management, and maintenance planes for a WAN backbone. In various embodiments there exists a geographic co-location of the most critical network elements (i.e., the CCLCs and the CTSs of the condensed core) which advantageously enables the concentration of maintenance and repair personnel within a few operations centers.

In various embodiments, the condensed core topology enables a low-cost option for the expansion of the aggregate forwarding capacity of the WAN backbone in response to growing traffic demands. Moreover, service providers are able to gradually upgrade a pre-existing WAN backbone infrastructure without disrupting its operation since the condensed core can be gradually deployed. That is, the condensed core may be deployed and connected to some of the PoPs while other PoPs are still connected through pre-existing infrastructure.

In various embodiments, the condensed core topology simplifies the frameworks for fault resilience and fault recovery due to the following properties of the condensed core architecture: (1) Easier fault isolation by localization of most fault events within geographically concentrated entities such as the condensed core and the PoPs; and (2) reduction of the signaling latencies involved in the automated recovery mechanisms, again by reduction of their geographical scope of execution.

In various embodiments, reduced energy consumption of WAN IP backbone networks is achieved by replacing the core IP routers of traditional backbone architectures with instances of a single-chip switching element called the core transport switch (CTS). A CTS dissipates much less power than an IP router of identical forwarding capacity because it removes all IP routing functions and because it ensures that the size of its packet buffer memory is small enough to allow its implementation entirely on chip. The removal of all IP routing functions eliminates the complex packet processing devices and the power-hungry external memories for IP lookup tables that are typical of IP router designs. The on-chip integration of the memories that implement the packet buffers eliminates the power dissipation of the large external memories commonly used in IP routers for buffering packets, as well as the interfaces with the packet processing devices.

Within the context of the various embodiments of a core routing system described herein, energy efficiency of the WAN backbone is improved by transferring a large portion of its forwarding capacity from energy-heavy IP routers to instances of an energy-light packet switching element called the core transport switch (CTS). The power consumption of the CTS is orders of magnitude lower than that of an IP router, because the CTS minimizes packet processing and eliminates all off-chip memories. These energy-saving simplifications are enabled by the elimination of all IP routing functions and by the enforcement of tight bounds on the maximum size of the packet buffers that guarantee lossless operation of the WAN backbone.

One embodiment of the invention provides a condensed core apparatus that in the network backbone path between access routers uses never more than one routing node. Specifically, a condensed core for routing packets between access routers, comprising a plurality of ingress routers, each ingress router configured to receive packets from one or more access routers, determine a destination address associated with each received packet, and map each packet to one or more of a plurality of paths terminating at an access router associated with the destination address; a plurality of core transport switches, each core transport switch supporting a plurality of paths, and a plurality of egress switches, each egress switch configured to convey toward one or more access routers packets received at the egress switch via paths supported by the egress switch and one or more core transport switches.

In this embodiment, after traversing the network of CTS elements, the next routing node found by a packet is the destination access router of the packet. In this embodiment, there is no "egress router" between the CTS elements in the condensed core and the destination access router. The packet may traverse the same hardware that makes up an "ingress router", but logically the function of that hardware on the packet is the same as that of a CTS element in that there is no IP header lookup at that element. In this embodiment, the final logical element is deemed to be an "egress switch", which can be physically co-located with the ingress router.

In a further embodiment, various core and egress switches are used, and either long-range links or short-range links may be used for some or all of the connections. Specifically, in one embodiment the ingress routers are coupled to respective access routers via long-haul connections or by short-range links, the ingress routers and egress switches are coupled to core transport switches by short-range links, core transport switches are coupled to other core transport switches by short-range links, and the egress switches are coupled to respective access routers via long-haul connections or by short-range links.

In a further embodiment, each path from an ingress router to an access router is supported by a predefined number of core transport switches.

In a further embodiment, various flow control adaptations are provided to minimize the size of the buffer memories. For example, in one embodiment at least some of the core transport switches are capable of dispatching flow control information to the ingress routers and other core transport switches. In another embodiment, some or all of the egress switches are capable of dispatching flow control information to the ingress routers and core transport switches. In another embodiment, the ingress routers and core transport switches are capable of utilizing the flow control information to adjust the order in which they deliver packets out to the respective paths.

In another embodiment, the memory used to implement packet buffers of one or more of the core transport switches and/or one or more of the egress switches is integrated with the packet handling logic in a single electronic component.

While the foregoing is directed to various embodiments of the present invention, other and further embodiments of the invention may be devised without departing from the basic scope thereof. As such, the appropriate scope of the invention is to be determined according to the claims, which follow.

What is claimed is:

1. A condensed core architecture for routing packets between access routers, comprising:
    at least one ingress device, each ingress device configured to receive packets from one or more access routers, determine a destination address associated with each received packet, and map each packet to one or more of a plurality of paths terminating at an access router associated with said destination address;
    at least one egress device, each egress device configured to convey toward one or more access routers packets received at the egress device via paths supported by the egress device; and
    a plurality of geographically proximate core transport switches, each core transport switch configured for selectively switching data between the at least one ingress device and the at least one egress device wherein the condensed core architecture includes the plurality of core transport switches, the at least one ingress device and the at least one egress device located proximate to each other to form a local connections region of short-range links interconnecting the plurality of core transport switches with the at least one ingress device and the at least one egress device.

2. The condensed core architecture of claim 1, wherein said ingress devices and egress devices are coupled to respective access routers via long-haul connections thereby performing one or more functions associated with ingress routers and egress switches respectively.

3. The condensed core architecture of claim 1, wherein each path between an ingress device and an egress device is supported by a predefined number of core transport switches thereby performing one or more functions associated with ingress routers and egress switches respectively.

4. The condensed core architecture of claim 1, wherein said ingress devices, core transport switches and egress devices are geographically proximate to each other.

5. The condensed core architecture of claim 1, wherein each access router supports one or more regional networks associated with a common point of presence (POP).

6. The condensed core architecture of claim 1, wherein each packet is inspected only by said ingress device performing one or more functions associated with ingress router.

7. The condensed core architecture of claim 1, wherein said paths comprise label switched paths.

8. The condensed core architecture of claim 1, wherein said paths comprise secure tunnels.

9. The condensed core architecture of claim 1, wherein said core transport switches comprise Multi-Protocol Label Switching (MPLS) switching devices.

10. The condensed core architecture of claim 1, wherein said apparatus is adapted to be managed as a distributed router by a network management system.

11. The condensed core architecture of claim 1, wherein each packet is conveyed via each of a primary path and backup path to an egress switch associated with the destination access router.

12. A condensed core apparatus for routing packets between access routers, comprising:
    a plurality of condensed core line cards (CCLCs), wherein each condensed core line card comprises at least one ingress device and at least one egress device;
    the at least one ingress device configured to perform a plurality of functions including: 1) receive packets from one or more access routers, 2) determine a destination address associated with each received packet, and 3) map each packet to one or more of a plurality of paths terminating at an access router associated with said destination address;

the at least one egress device configured to convey toward one or more access routers packets received at the egress device via paths supported by the egress device; and a plurality of switching devices arranged in a mesh network interconnecting the plurality of condensed core line cards; wherein said ingress devices configured to receive packets from source access routers via long-haul connections and communicate with said switching devices via short-range links;

said switching devices configured to communicate with other switching devices via short-range links and communicate with destination access routers via long-haul connections.

13. The condensed core apparatus of claim 12, wherein said egress devices configured to transmit packets toward destination access routers via long-haul connections and communicate with said switching devices via short-range links.

14. The condensed core apparatus of claim 12, wherein each access router supports one or more regional networks associated with a common point of presence (POP).

15. The condensed core apparatus of claim 12, wherein the IP header of each packet that arrives at an ingress device performing one or more functions associated with ingress router is inspected only by said ingress router.

16. The condensed core apparatus of claim 12, wherein said paths comprise any of label switched paths or secure tunnels.

17. The condensed core apparatus of claim 12, wherein said apparatus is adapted to be managed as a distributed router by a network management system.

18. The condensed core apparatus of claim 12, wherein at least some packets are conveyed through the condensed core via either or both of a primary path and a backup path.

19. The condensed core apparatus of claim 12, wherein at least one of said core transport switches are capable of dispatching flow control information to said ingress routers and other core transport switches.

20. The condensed core apparatus of claim 13, wherein at least one of said egress switches is capable of dispatching flow control information to said ingress routers and said core transport switches.

21. The condensed core apparatus of claim 19, wherein said ingress routers and core transport switches are capable of utilizing flow control information to adjust the order in which they deliver packets out to the respective paths.

22. The condensed core apparatus of claim 12, wherein memory implementing packet buffers of said core transport switch is integrated with packet handling logic in a single electronic component.

23. A method for routing packets between access routers, comprising:

receiving packets associated with a source access router at one or more ingress devices;

determining a destination address associated with each received packet;

mapping each packet to one or more of a plurality of paths terminating at an access router associated with said destination address; and transmitting each packet toward a corresponding first of a predetermined number of geographically proximate core transport switches supporting each mapped path, wherein the predetermined number of core transport switches, the at least one ingress device located proximate to each other form a local connections region of short-range links interconnecting the plurality of core transport switches with the at least one ingress device.

24. The method of claim 23, wherein each mapped path is further supported by a geographically proximate egress switch configured to convey packets from a last of said predetermined number of geographically proximate core transport switches toward said access router associated with said destination address.

25. A non-transitory computer readable medium including software instructions which, when executed by a processor, perform a method for routing packets between access routers, the method comprising:

receiving packets at one or more ingress devices;

determining a destination address associated with each received packet;

mapping each packet to one or more of a plurality of paths terminating at an access router associated with said destination address; and transmitting each packet toward at least one core transport switch supporting a respective mapped path including an egress switch configured to convey packets toward said access router associated with said destination address; and wherein the at least one core transport switch, the at least one ingress device located proximate to each other form a local connections region of short-range links interconnecting the plurality of core transport switches with the at least one ingress device.

\* \* \* \* \*